April 20, 1937.   J. H. McKELVEY ET AL   2,077,705
WALL OF GLASS TANKS
Original Filed Aug. 31, 1932    4 Sheets—Sheet 1

INVENTORS
John H. McKelvey and
John W. Rogers
by Christy and Wharton
their ATTORNEYS April 20, 1937.    J. H. McKELVEY ET AL    2,077,705
WALL OF GLASS TANKS
Original Filed Aug. 31, 1932    4 Sheets-Sheet 2

INVENTORS
John H. McKelvey and
John W. Rogers
BY Christy and Wharton
their ATTORNEYS April 20, 1937. J. H. McKELVEY ET AL 2,077,705
WALL OF GLASS TANKS
Original Filed Aug. 31, 1932 4 Sheets-Sheet 3

INVENTORS
John H. McKelvey and
John W. Rogers
BY
Chrisey and Wharton
their ATTORNEYS April 20, 1937.　　　J. H. McKELVEY ET AL　　　2,077,705
WALL OF GLASS TANKS
Original Filed Aug. 31, 1932　　　4 Sheets-Sheet 4

INVENTORS
John H. McKelvey and
John W. Rogers
Christy and Wharton
their ATTORNEYS Patented Apr. 20, 1937

2,077,705

UNITED STATES PATENT OFFICE 2,077,705

WALL OF GLASS TANKS

John H. McKelvey, Kirkwood, and John W. Rogers, University City, Mo., assignors to Laclede-Christy Clay Products Company, a corporation of Missouri Continuation of applications Serial No. 631,166, August 31, 1932, and Serial No. 36,630, August 15, 1935. This application November 4, 1935, Serial No. 48,166

6 Claims. (Cl. 49—54)

This invention relates to the walls of glass tanks and to means and method of rendering such walls effective and durable. This application for Letters Patent is a continuation of applications filed by us August 31, 1932, Serial No. 631,166, and August 15, 1935, Serial No. 36,630.

Figure 1:
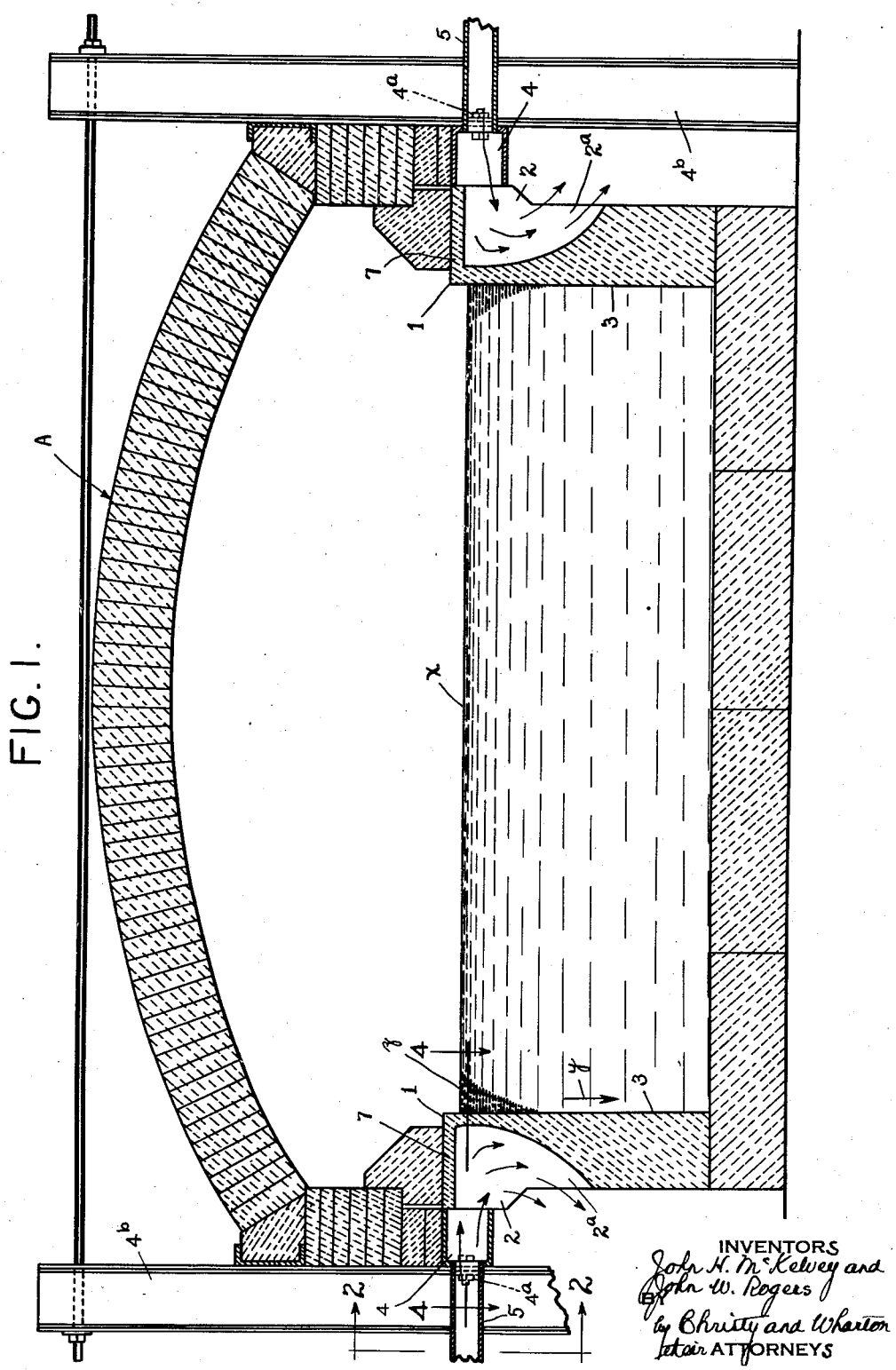
Figure 2:
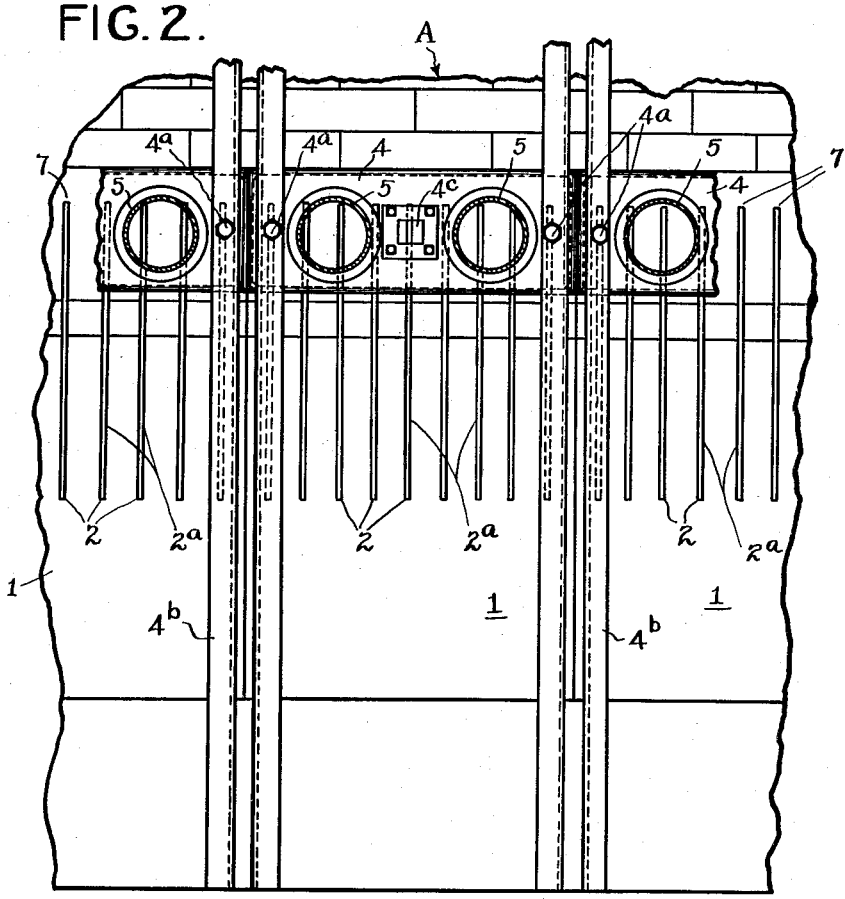
Figure 3:
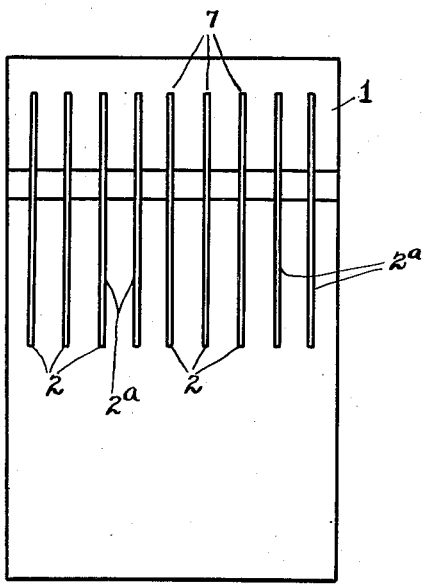
Figure 4:
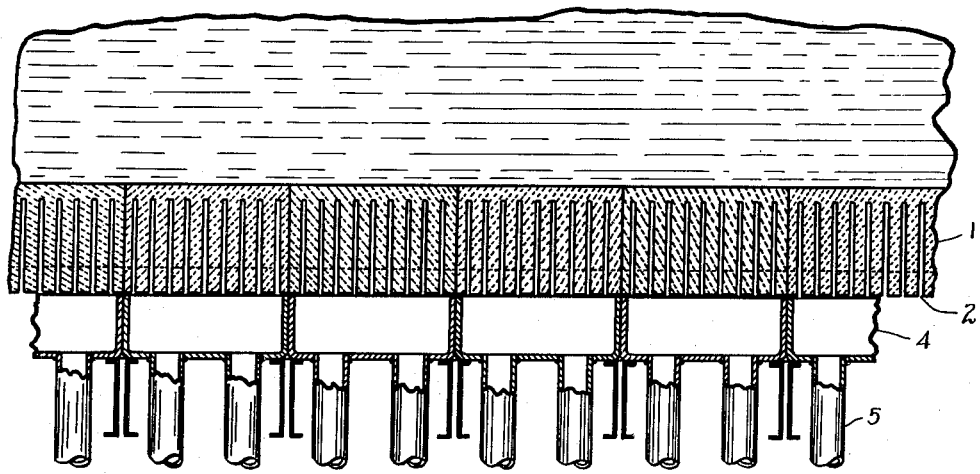
Figures 5, 6, 7:
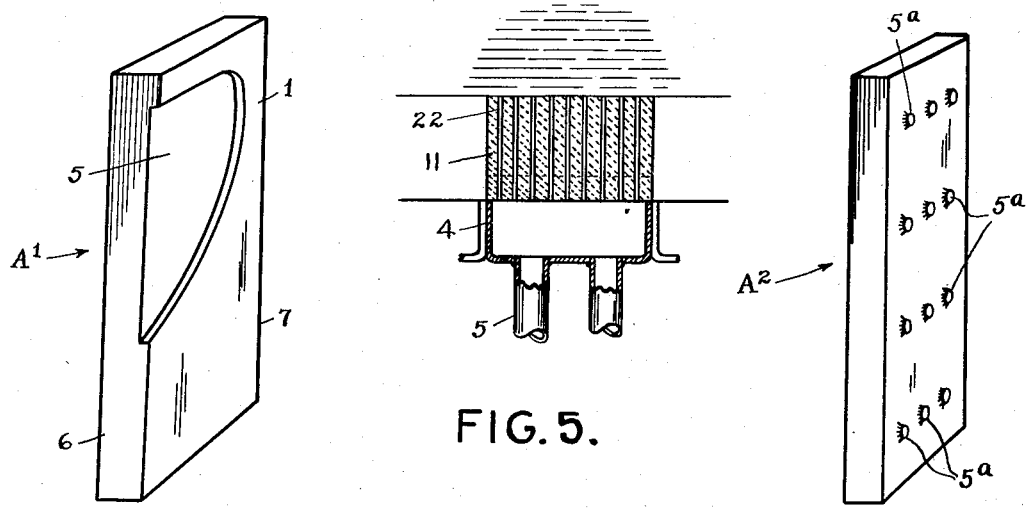
Figure 8:
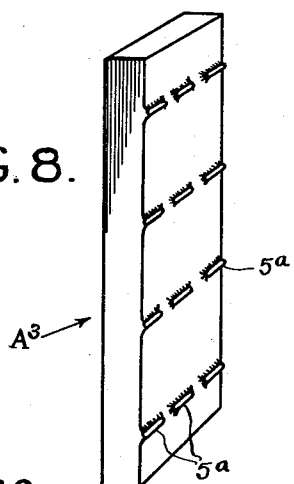
Figure 9:
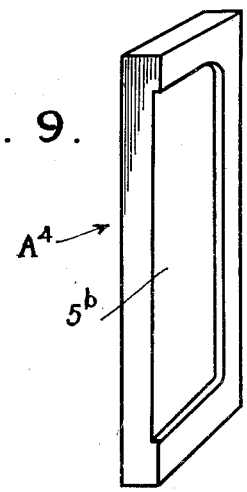

The invention is illustrated in the accompanying drawings. Fig. 1 is a view in vertical and transverse section of a glass furnace including a tank in the structure of whose side walls our invention is embodied; Fig. 2 is a fragmentary view in vertical and longitudinal section, and to larger scale, of the structure of Fig. 1. The plane of section of Fig. 2 is indicated in Fig. 1 by the line 2—2. Fig. 3 is a view in elevation of one of the blocks of which the side wall of the tank of Fig. 1 is built. Fig. 4 is a fragmentary view in horizontal section, on the plane indicated at 4—4, Fig. 1. Fig. 5 is a view corresponding to Fig. 4, illustrating a modification in detail. Figs. 6–12 are views in perspective, to like scale with Figs. 1 and 4, of blocks of refractory material of a variety of specific shapes that may be employed alternatively to the blocks shown in Figs. 1–4. Figs. 13 and 14 are views in vertical section of assemblies of blocks of specific form; the blocks of Fig. 13 are such as that shown in Fig. 6, and those of Fig. 14 are such as that of Fig. 8.

In the operation of a glass furnace a pool of molten glass is maintained within the tank. The operation is continuous; glass-forming materials are introduced to the tank at one end, and refined glass is withdrawn from the tank at the other end. A vault surmounts the tank. High temperature is maintained by causing flame to play upon the surface of the pool of glass beneath the vaulted roof. In consequence of the manner in which (in order to maintain it in molten condition) continuing supplies of heat are communicated to the glass, convection currents are set up within the pool of glass within the tank. These currents flow superficially outward to the tank walls, thence downward to the bottom of the tank, inward over the bottom of the tank from the walls toward the center, and then upward toward the surface. The walls of the tank are formed of refractory material, and under the combined chemical and physical attack of the stream of molten glass are gradually eroded away.

It is known that, if in the progress of the operation of a glass furnace the tank walls be cooled from without, the rate of erosion may be reduced.

Glass is a substance that passes from liquid to solid condition through an intermediate condition of viscosity; it does not possess a definite melting-point; within a range of three to six hundred degrees it passes from a state of high fluidity to a state of substantial solidity, and within the narrower range of three hundred degrees the viscosity varies at maximum rate.

We have perceived that the cooling of the tank walls is effective to prolong their life, by virtue of the fact that the glass in immediate contact with the walls is cooled and its viscosity is increased. The flow of glass downward upon the face of the walls is retarded, and the rate of erosion is reduced. We have discovered that, by appropriate slotting of the walls, and by maintaining properly directed streams of air within the slots, it is possible to arrest the flow of glass over the surface of the refractory material, and to reduce the rate of such flow substantially to zero. At the same time, elsewhere than at the margin of the pool, the body of the glass within the tank continues in the necessary high condition of fluidity. The convection currents continue; there is downward flow at the margins of the pool; but the sweep of the stream is shifted inward; the glass that immediately rests upon the surface of the refractory wall is at rest, or nearly so; and the flow is wholly (or substantially) within the body of glass itself. The refractory wall itself is screened behind a substantially stationary facing of relatively cool glass.

We have further perceived that, by concentrating the cooling effect at the glass-line, a relatively viscid condition created at the glass-line will be most effective in shifting the stream inward, so that there is little or no flow over the surface of the refractory material of which the side wall is built.

We have adopted a particular structure of the furnace walls. Not only have we slotted them with vertical slots that extend from the outer surface of the wall inward; not only have we caused cooling streams of air to flow in such slots; we have increased the number of such slots, reduced their width, and the interval of their succession; we have caused the streams of cooling air to enter the slots at their upper ends and substantially at the level of the glass-line within the tank, and to flow thence downwardly, and to escape at the lower ends of the slots. In consequence, we maintain a condition of heat-exchange that is most pronounced at the glass-line; we achieve an increased cooling effect; and we establish a condition of cooling that is under control, so that the optimum condition of viscosity at the margin of the pool may be established and (as furnace operation progresses) may be maintained.

We have further discovered that, by proper proportioning of the slots, particularly in the matter of width and interval of succession, it becomes possible to form an effective furnace wall of grid construction, so that the cooling streams of air flowing in the slots will bring the glass that intrudes into the slots to solid condition, bridging the spaces. The side walls then are faced interiorly with a skull or shell of solid or viscid glass, within which skull or shell the convection currents circulate. We have discovered that, by forming the side walls of the tank with slots that extend approximately to, but do not actually penetrate, the inner face of the wall, it is possible and practicable and desirable to effect in normal furnace operation the erosion of the wall to the point where the slots are opened, so as to bring about the grid-like wall formation alluded to. The glass that breaks through and intrudes into the slots is by the cooling streams of air solidified, and so the condition is established in which the pool of molten glass is held in a shell or skull of solid glass, which in turn is supported by the grid-like furnace wall.

We have further perceived that it is entirely possible initially to form the furnace walls with slots that penetrate the inner face of the wall, and so initially to provide a tank with grid-like walls, and to face these walls interiorly at the commencement of furnace operation with plates of solid glass, and so to establish the proper condition of air circulation in the slots. Thereafter, as furnace operation continues, the plates of glass facing the walls within will become merged, and their identity lost, in the total bath of glass within the tank, and the same condition will be established that has been described—of a shell of relatively solid glass sustained by the furnace wall, and sustaining within it the molten body of glass with its circulating streams.

Such initial closing of the slots of a grid-formed furnace wall may be effected by other material: by a luting or plastering of clay, for instance, or such other material as will merge without appreciable disadvantage in the body of glass that is melted and refined within the tank. Or again, in suitable case, the glass batch itself may afford sufficient closure of the inner ends of the slots. And in all cases the cooling streams of air flowing in the slots will be effective to congeal material that being melted tends to intrude into the slots.

Referring to Fig. 1 of the drawings, a furnace A is shown, held by buck-staves 4b, and including a tank with side-walls 3. A vault overarches the tank. This tank contains a pool of molten glass whose surface extends in the line x. The structure of the side-walls is shown in Figs. 1–4. The walls are formed of blocks 1 of refractory material. They extend in this instance integrally throughout the height of the walls. Each block is approximately 42 inches high, 18 inches wide, and 12 inches thick. The dimensions are given as exemplary—not as limitations upon the invention.

Slots 2 are formed in the blocks 1. These slots are vertically disposed, they extend from the outer faces of the blocks inward in planes perpendicular to the inner face of the wall, and they extend from the upper ends of the blocks downward. In the particular case illustrated these slots may be understood to be approximately one quarter of an inch in width, and to be spaced at a centre-to-centre interval of two inches. At their upper ends they extend inward to a depth of approximately ten inches, leaving the wall thickness at these points no greater than two inches. From such maximum depth the slots in their downward extent grow shallower and end somewhat below the mid-line in the height of the furnace. It may be found convenient to form these slots as saw-kerfs cut into the substance of an otherwise solid tank block. It will be observed in Fig. 1 that the slots do not extend all the way to the upper ends of the blocks, but are closed above. In case, therefore, the slots should be formed as saw-cuts in the tank blocks, it will be found convenient to sink them through both the side and end faces of the initial blocks and then to apply slabs upon the upper ends of the initial blocks, forming the portion 7 of the completed block and closing the slots above. In the assembly the slots extend downward from substantial coincidence with the plane of the surface x of the pool of glass within the tank.

For our purposes, employing such materials as are usual, we have found the permissible range of slot width to be from one sixteenth of an inch to an inch and a quarter, and the permissible range of slot spacing to be from one to six inches. Obviously, the narrower the slot the smaller should be the space interval between slots, to gain the same cooling effect.

Means are provided for causing cooling streams of air to enter the slots at their upper ends and to flow thence downwardly and to escape at the lower ends of the slots. Such means are found in a header, conveniently formed in sections and arranged in the assembly section by section externally upon the successive blocks 1 that compose the tank wall. Each header section consists of a box 4, formed conveniently of cast-iron, with one side open, extending horizontally of and overlying the outer face of the tank block, with its open side in immediate communication with the slots 2 at their upper ends. The header section incloses the upper ends of the slots; it extends downward for less than half the length of the slots; and it leaves the slots at their lower ends open to the air. Conduits 5 open into header sections 4, and through these conduits air at any desired pressure and temperature may be introduced. The header sections may be provided with windows 4c. The header sections may be mounted upon and secured by bolts 4a upon the buck-staves 4b of the furnace structure.

It is manifest that the tank wall is equipped with a cooling device; that the tongues of refractory material, of one substance with the tank blocks, intervening between successive slots 2, are heat-radiating fins; that, as furnace operation continues, heat is constantly flowing in relatively large quantities from the margins of the pool of glass within the tank into the so-constituted heat-radiating fins, and is communicated thence to and carried away upon the streams of air that, flowing in the slots 2, sweep over the surfaces of such fins and then escape to the open air. And it will particularly be observed that both by the arrangement of the parts and by the proportioning of the slots the heat-absorption is of maximum effect at the upper end of the slots and that the cooling of the glass is of maximum effect at the glass-line within the tank.

When the furnace is in operation and flame is playing upon the surface x of the pool of molten glass within the tank, the convection currents are flowing as described, superficially outward, and then downward over the face of the side-walls of the tank. The direction of such downward flow is indicated by the arrow y, Fig. 1. The effect of the cooling apparatus described is revealed in a tendency of the molten glass to grow viscid at the margin of the pool, in the region z, indicated by shading in Fig. 1. The more intense the cooling effect the greater the viscosity and the wider the extent of the region of viscosity, both inward and downward from the margin line. Viscosity occurring here, not only is the sweep of the current upon the surface of the refractory slowed down; the region of rapid flow is shifted outwardly from the margin of the pool; and as the cooling effect increases, the side-wall of the tank is increasingly protected from mechanical erosion by a layer of glass in which movement grows slower and slower, until it ceases. Furthermore, such chemical reaction as may occur between glass and refractory is, in consequence of the slowing down of the movement of the glass over the surface of the refractory, correspondingly and greatly reduced in its rate of progress.

At the beginning of a campaign—when a newly built or newly relined furnace goes into operation—the circulation of air through the cooling apparatus described may or may not be set up. In any case the molten glass will be effective with greater or less rapidity to erode the face of the refractory blocks that constitute the side walls, until at length the thin partition is eaten away and the glass has ingress to the slots 2. Before this stage is reached, however, the circulation of air will have been set up, and when at length the glass gains ingress to the slots the conditions of cooling are such that the entering glass solidifies; the solidified glass bridges the narrow slot. Thereafter the condition of solidity spreads, and a shell or skull of solid glass solidifies upon the face of the now grid-formed side-wall; and within this skull or shell of solidified glass the molten pool is held. Within this molten pool the convection currents continue to circulate; but the down-flowing stream no longer sweeps the surface of the refractory that forms the tank block; it sweeps with outwardly diminishing speed over the solid skull or shell of glass with which the tank wall now is faced.

As furnace operation progresses the attendant looking through window 4c and noting the degree of incandescence within the slots 2 may regulate the temperature or the pressure or both the temperature and the pressure of the stream of air that flows from header 4 into slots 2; and thus may establish and maintain optimum conditions, so far as concerns the viscosity of the glass in region z, the extent of region z, and (eventually) so far as concerns the thickness of the skull or shell of solid glass that, shaped upon the sidewall, holds within itself the molten portion of the pool.

In Fig. 5 illustration is afforded of tank blocks 11 slotted with slots 22 that initially extend all the way through the side-wall. In such cases, at the beginning of a campaign these slots at their inner end will be so far closed (whether by overlaid sheets of glass, or by in-plastered luting, or perhaps by the body of the furnace charge in finely divided condition) as to insure proper circulation in the manner described of cooling streams of air. Such being the case, as the body of glass within the tank melts, the flow of molten material will solidify as it seeks ingress to the slots, and so the condition already described will be brought about, of a pool of molten glass within a solid skull or shell shaped upon and resting against a grid-formed tank wall.

Figure 10:
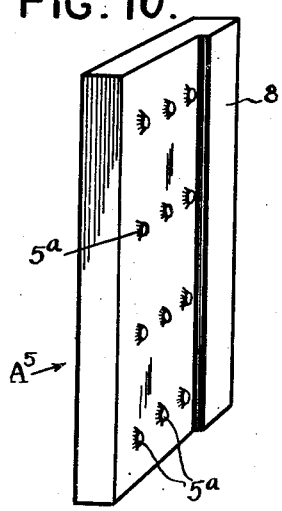
Figure 11:
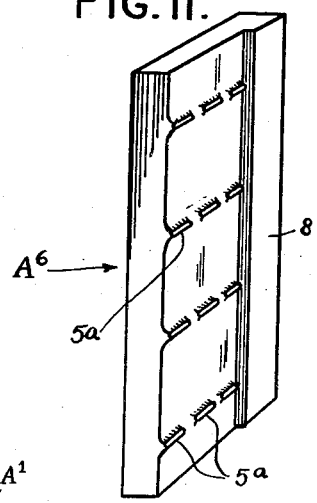
Figure 12:
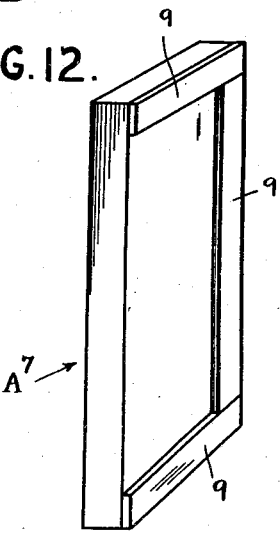
Figure 13:
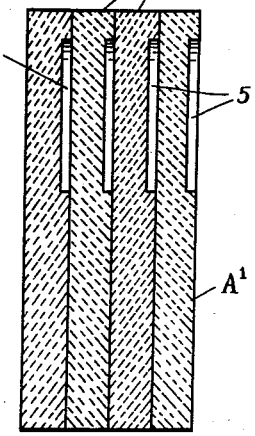
Figure 14:
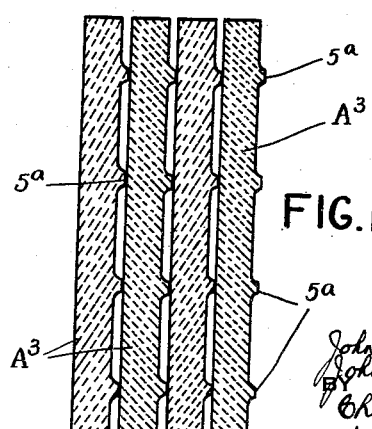

Figs. 6–14 afford illustration of variety in the manner of formation of the slotted side-wall of the tank. Instead of the tank block 1 (11) of Figs. 1–5 of relatively great width (in the direction of the longitudinal extent of the furnace wall) narrow blocks A'—A⁷ of Figs. 6–12 may be provided. Each is of a width corresponding substantially to the centre-to-centre spacing of the slots in the assembled wall. These narrow blocks may be recessed, as indicated at 5, 5b (Figs. 6 and 9), or may be provided with outstanding spacing lugs 5a that may be of substantial extent vertically (Fig. 7) or horizontally (Fig. 8), or the narrow blocks may be spaced apart in the assembly to form intervening slots, by means of interposed strips 9 (Fig. 12). It will be observed of the blocks of Figs. 6, 9, and 12 that the assembled structure is so far like that of Figs. 2 and 4 that at the beginning of the campaign the slots do not extend through the inner face of the tank wall; and it will be observed of the blocks of Figs. 7 and 8 that in the assembled structure the slots do (cf. Fig. 5) extend through the inner surface of the tank wall, and do from the beginning afford a grid-formed tank wall. The blocks of Figs. 7 and 8 may, however, readily be modified to afford a wall that initially is interiorly unbroken, by the provision of the raised edges 8, as illustrated in Figs. 10 and 11. Fig. 13 shows in vertical section the assembly of a plurality of the blocks of Fig. 6, forming slots 5 that, as will be understood, do not penetrate the inner face of the newly built wall; and Fig. 14 shows in like manner the assembly of a plurality of the blocks of Fig. 8. In this case the slots formed by the spacing lugs 5a do extend through and do initially break the continuity of the inner face of the tank wall.

In the foregoing description air has been recognized to be the appropirate medium, which, circulating in the slots in the wall, accomplishes the desired effect. It is the fluidity of the air that makes it serviceable for the ends in view. And we contemplate fluid media generally, although air is the medium which ordinarily will be practically preferable.

The benefits of the invention are, first, that the rate of erosion of the walls of glass tanks is reduced and brought under control; second, that the initial thickness of the wall, relieved of a limiting condition, may be varied and increased beyond what hitherto has been found practicable; and, third, the danger of a break in the tank wall such as to result in the loss of a tank-full of molten glass, or the substantial part of a tank-full, is, because of the preventive means of the invention, virtually eliminated.

We claim as our invention:

1. A glass tank with refractory walls provided with vertically disposed cooling slots that extend from the glass-line downwardly and from an outer portion of the wall toward the inner surface, together with means for causing cooling streams of fluid to flow through said slots from the upper ends thereof downwardly, the slots being of a width ranging from one sixteenth of an inch to an inch and a quarter, and the centre-to-centre spacing of the succession of slots ranging from one to six inches, whereby the glass of a pool brought to molten condition within the tank may be maintained in viscid state in a region that extends inwardly and downwardly from the margin line of the pool.

2. The method herein described of maintaining the glass at and adjacent to the margin of an otherwise molten pool within a tank in non-molten condition which consists in causing the glass penetrating at the glass-line the spaces in a grid-formed furnace wall to be swept where such penetration occurs by downwardly directed cooling streams of fluid.

3. The method herein described of developing in situ a glass tank with grid-formed walls containing within a shell of solid glass a molten pool of glass, which consists in developing within a tank having internal and vertically extending slots in its side-walls a circulating pool of wall-erosive glass, and causing cooling streams of fluid to flow downward in such slots until the glass, eroding the side-walls and gaining ingress to the slots, is locally cooled by such streams of air below the point of fluidity.

4. A wall for a glass tank of vertically slotted and grid-like formation, the slots being of a width not exceeding an inch and a quarter and being spaced apart at intervals not exceeding six inches, and extending from the glass-line downward, and means for causing cooling streams of fluid to flow in the slots from the upper ends downward, whereby as furnace operation continues the pool of molten glass within the tank is immediately carried in a scull of congealed glass with intrusions into the said slots.

5. A wall for a glass tank of vertically slotted and grid-like formation, the slots being of a width of the order of a quarter of an inch and being spaced apart at intervals of the order of two inches and extending downward from the glass-line, and means for causing cooling streams of fluid to flow in the slots from the upper ends downward, whereby as furnace operation continues and erosion of the inner face of the wall progresses the streams of cooling fluid congealing the glass on intrusion into the slots maintain their passageway.

6. A wall for a glass tank of a thickness of the order of twelve inches and of vertically slotted and grid-like formation, the slots being of a width of the order of a quarter of an inch and being spaced apart at intervals of the order of two inches and extending at the glass-line from the outer surface to a point within two inches of the inner surface of the wall, and extending at lower levels to a diminishing distance inward, and means for causing cooling streams of fluid to flow in the slots from the upper ends downward, whereby cooling effect is concentrated at the level of the pool of glass and, by the congealing of intruding glass, maintains the slots open as furnace operation progresses.

JOHN H. McKELVEY.
JOHN W. ROGERS.